(12) United States Patent
Greenberg et al.

(10) Patent No.: US 11,411,841 B2
(45) Date of Patent: *Aug. 9, 2022

(54) RELIABLE TRANSFER OF NUMEROUS GEOGRAPHICALLY DISTRIBUTED LARGE FILES TO A CENTRALIZED STORE

(71) Applicant: iUNU, Inc., Seattle, WA (US)

(72) Inventors: Adam Phillip Takla Greenberg, Seattle, WA (US); Matthew Charles King, Seattle, WA (US)

(73) Assignee: iUNU Inc., Seattle, WA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/998,925

(22) Filed: Aug. 20, 2020

(65) Prior Publication Data
US 2021/0006476 A1    Jan. 7, 2021

Related U.S. Application Data (63) Continuation of application No. 15/271,658, filed on Sep. 21, 2016, now Pat. No. 10,791,037, which is a continuation-in-part of application No. 15/271,569, filed on Sep. 21, 2016, now Pat. No. 10,339,380.

(51) Int. Cl.
*H04L 41/5019* (2022.01)
*H04L 67/62* (2022.01)
*H04L 67/06* (2022.01)

(52) U.S. Cl.
CPC ........ *H04L 41/5019* (2013.01); *H04L 67/325* (2013.01); *H04L 67/06* (2013.01)

(58) Field of Classification Search
CPC .......................... H04L 41/5019; H04L 67/325
See application file for complete search history.

(56) References Cited

U.S. PATENT DOCUMENTS

| | | | |
|---|---|---|---|
| 5,841,883 | A | 11/1998 | Kono et al. |
| 7,013,284 | B2 | 3/2006 | Guyan et al. |
| 7,184,846 | B2 | 2/2007 | Albright et al. |

(Continued)

FOREIGN PATENT DOCUMENTS

| | | |
|---|---|---|
| EP | 2736318 A1 | 6/2014 |
| JP | 2011103870 A | 6/2011 |

(Continued)

OTHER PUBLICATIONS

Canadian Patent Application No. 3,089,725 Office Acton dated Aug. 18, 2021, 5 pages.

(Continued)

*Primary Examiner* — Philip J Chea
*Assistant Examiner* — Mohammed Ahmed
(74) *Attorney, Agent, or Firm* — Han Santos, PLLC (57) ABSTRACT

This disclosure describes, systems, devices, and computer-implemented methods that facilitate the upload of captured images to a remote data store based on satisfying upload conditions. More specifically, a captured image may be received from an image capture functions and analyzed to determine whether the captured image has sufficient information. In response to having sufficient information, an upload condition may be identified to upload the captured image to a remote data store. The captured image may be uploaded to the remote data store, based at least in part on the upload condition.

18 Claims, 5 Drawing Sheets

(56) References Cited

U.S. PATENT DOCUMENTS

| | | | |
|---|---|---|---|
| 7,711,576 B1 | 5/2010 | Duett et al. | |
| 8,145,330 B2 | 3/2012 | Emoto | |
| 8,249,926 B2 | 8/2012 | Avey et al. | |
| 8,594,375 B1 | 11/2013 | Padwick | |
| 8,613,158 B2 | 12/2013 | Conrad | |
| 8,850,742 B2 | 10/2014 | Dubé | |
| 9,565,812 B2 | 2/2017 | Wilson | |
| 9,603,316 B1 | 3/2017 | Mansey et al. | |
| 9,779,442 B1 | 10/2017 | Cimic et al. | |
| 10,002,375 B1 | 6/2018 | Scythes et al. | |
| 10,791,037 B2* | 9/2020 | Greenberg | H04L 67/325 |
| 2003/0227487 A1 | 12/2003 | Hugh | |
| 2004/0231240 A1 | 11/2004 | Kuiper et al. | |
| 2005/0072862 A1 | 4/2005 | Skinner | |
| 2006/0196116 A1 | 9/2006 | Zettl | |
| 2007/0065857 A1 | 3/2007 | Glaser et al. | |
| 2007/0179854 A1* | 8/2007 | Ziv | G06Q 30/02 705/14.27 |
| 2007/0289207 A1 | 12/2007 | May et al. | |
| 2008/0066072 A1 | 3/2008 | Yurekli et al. | |
| 2009/0005247 A1 | 1/2009 | Spiegel et al. | |
| 2009/0112789 A1* | 4/2009 | Oliveira | G06F 16/122 |
| 2009/0132543 A1* | 5/2009 | Chatley | H04L 67/1012 |
| 2009/0144284 A1* | 6/2009 | Chatley | G06F 3/067 |
| 2009/0164741 A1* | 6/2009 | Takaki | G06F 16/51 711/158 |
| 2010/0305966 A1 | 12/2010 | Coulter et al. | |
| 2011/0090960 A1* | 4/2011 | Leontaris | H04N 19/14 375/240.18 |
| 2011/0137757 A1 | 6/2011 | Paolini et al. | |
| 2011/0196710 A1 | 8/2011 | Rao | |
| 2012/0003728 A1 | 1/2012 | Lanoue et al. | |
| 2012/0109387 A1 | 5/2012 | Martin et al. | |
| 2012/0249741 A1 | 10/2012 | Maciocci et al. | |
| 2013/0006401 A1 | 1/2013 | Shan | |
| 2013/0185108 A1 | 7/2013 | Bainbridge et al. | |
| 2013/0191836 A1 | 7/2013 | Meyer | |
| 2013/0235183 A1 | 9/2013 | Redden | |
| 2013/0332205 A1 | 12/2013 | Friedberg et al. | |
| 2014/0026474 A1 | 1/2014 | Kulas | |
| 2014/0035752 A1 | 2/2014 | Johnson | |
| 2014/0115958 A1 | 5/2014 | Helene et al. | |
| 2014/0154729 A1 | 6/2014 | Leyns et al. | |
| 2014/0168412 A1 | 6/2014 | Shulman et al. | |
| 2014/0176688 A1* | 6/2014 | Ibamoto | H04N 5/23229 348/61 |
| 2014/0200690 A1 | 7/2014 | Kumar | |
| 2014/0288850 A1 | 9/2014 | Avigdor et al. | |
| 2014/0324490 A1 | 10/2014 | Gurin | |
| 2015/0015697 A1 | 1/2015 | Redden et al. | |
| 2015/0026092 A1 | 1/2015 | Abboud et al. | |
| 2015/0120349 A1 | 4/2015 | Weiss | |
| 2015/0131867 A1 | 5/2015 | Lin et al. | |
| 2015/0185995 A1 | 7/2015 | Shoemaker et al. | |
| 2015/0227707 A1 | 8/2015 | Laws et al. | |
| 2015/0230409 A1 | 8/2015 | Nicole et al. | |
| 2015/0261803 A1 | 9/2015 | Song et al. | |
| 2015/0286897 A1* | 10/2015 | Spaith | H04N 5/44 382/224 |
| 2015/0295877 A1 | 10/2015 | Roman | |
| 2016/0026940 A1 | 1/2016 | Johnson | |
| 2016/0050840 A1 | 2/2016 | Sauder et al. | |
| 2016/0050862 A1 | 2/2016 | Walliser | |
| 2016/0086032 A1 | 3/2016 | Pickett | |
| 2016/0127599 A1* | 5/2016 | Medicherla | H04N 1/00002 358/403 |
| 2016/0140868 A1 | 5/2016 | Lovett et al. | |
| 2016/0148104 A1 | 5/2016 | Itzhaky et al. | |
| 2016/0205872 A1* | 7/2016 | Chan | G05D 1/0094 |
| 2016/0216245 A1 | 7/2016 | Sutton | |
| 2016/0239709 A1 | 8/2016 | Shriver | |
| 2016/0278300 A1 | 9/2016 | Clendinning et al. | |
| 2016/0345517 A1 | 12/2016 | Cohen et al. | |
| 2017/0030877 A1 | 2/2017 | Miresmailli et al. | |
| 2017/0038749 A1 | 2/2017 | Mewes et al. | |
| 2017/0039657 A1 | 2/2017 | Honda et al. | |
| 2017/0064912 A1* | 3/2017 | Tabakman | A01G 31/06 |
| 2017/0068924 A1 | 3/2017 | Tanaka et al. | |
| 2017/0250751 A1* | 8/2017 | Kargieman | G06V 20/188 |
| 2017/0286772 A1 | 10/2017 | Workman et al. | |
| 2017/0300846 A1 | 10/2017 | Harwood | |
| 2017/0374323 A1 | 12/2017 | Gornik | |
| 2018/0039261 A1 | 2/2018 | Haller et al. | |
| 2018/0041545 A1* | 2/2018 | Chakra | H04L 67/1085 |
| 2018/0052637 A1* | 2/2018 | Chen | G06F 12/0246 |
| 2018/0083844 A1* | 3/2018 | Greenberg | H04L 67/325 |
| 2018/0276504 A1 | 9/2018 | Yamaguchi et al. | |
| 2018/0325051 A1 | 11/2018 | Brandao et al. | |
| 2019/0034736 A1 | 1/2019 | Bisberg et al. | |
| 2019/0212316 A1 | 7/2019 | Sutton | |

FOREIGN PATENT DOCUMENTS

| | | |
|---|---|---|
| KR | 20130005540 A | 1/2013 |
| KR | 20140077513 A | 6/2014 |
| KR | 20140114089 A | 9/2014 |
| KR | 20150000435 A | 1/2015 |
| KR | 20150000435 U | 1/2015 |
| WO | 2011115666 A2 | 9/2011 |
| WO | 2014100502 A1 | 6/2014 |

OTHER PUBLICATIONS

S. Nagasai, S. Jhansi Rani, Plant Disease Identification using Segmentation Techniques, Sep. 2015, International Journal of Advanced Research in Computer and Communication Engineering, vol. 4, Issue 9, pp. 411-413. (Year: 2015).

U.S. Appl. No. 15/271,727, Notice of Allowance dated Aug. 13, 2021, 130 pages.

U.S. Appl. No. 15/271,749, Final Office Action dated Jun. 30, 2021, 86 pages.

U.S. Appl. No. 15/891,110, Notice of Allowance dated Feb. 18, 2021, 17 pages.

U.S. Appl. No. 15/891,110, Notice of Allowance dated Mar. 18, 2021, 16 pages.

U.S. Appl. No. 16/859,891, Final Office Action dated Feb. 19, 2021, 32 pages.

U.S. Appl. No. 16/859,891, Final Office Action dated May 27, 2021, 24 pages.

European Patent Application No. 17853934.2, Office Action dated Nov. 11, 2020, 7 pages.

U.S. Appl. No. 15/271,727, Final Office Action dated Nov. 2, 2020, 36 pages.

Non-Final Office Action for U.S. Appl. No. 15/271,569, dated Jan. 23, 2018, 33 pages.

European Patent Application No. 17853932.6, Extended European Search Report dated Feb. 21, 2020, 12 pages.

European Patent Application No. 17853934.2, Extended European Search Report dated Dec. 13, 2019, 10 pages.

International Application No. PCT/US2019/013927, International Search Report and Written Opinion dated May 7, 2019, 9 pages.

International Search Report and Written Opinion for PCT Application No. PCT/US2017/052800 dated Jan. 16, 2018, 14 pages.

International Search Report and Written Opinion for PCT Application No. PCT/US2017/052805 dated Jan. 9, 2018, 14 pages.

Jean et al. AR Plants: Herbal Plant Mobile Application utilizing Augmented Reality. Dec. 2017. [retrieved on Apr. 1, 2019]. Retrieved from the Internet:. entire document.

Marco Augustin et al., 'A framework for the extration of quantitative traits from 2D images of mature *Arabidopsis thaliana*', Oct. 16, 2015 (https://link.springer.ocm/article/10.1007/s00138-015-0720-z) See abstract; and sections 3-4.

Markus Funk et al: "Interactive worker assistance", Pervasive and Ubiquitous Computing, ACM, 2 Penn Plaza, Suite 701 New York NY 10121-0701 USA, Sep. 12, 2016 (Sep. 12, 2016), pp. 934-939, XP058279126, DOI: 10.1145/2971648.2971706 ISBN: 978-1-4503-4461-6.

(56) References Cited

OTHER PUBLICATIONS

Notice of Allowance (U.S. Appl. No. 15/271,569), dated Mar. 11, 2019.
Qing Yao et al: "Application of Support 1-15 Vector Machine for Detecting Rice Diseases Using Shape and Color Texture Features", Engineering Computation, 2009. ICEC 109. International Conference on, IEEE, Piscataway, NJ, USA, May 2, 2009 (May 2, 2009), pp. 79-83, XP031491490,ISBN: 978-0-7695-3655-2 * the whole document*.
Restriction Requirement (U.S. Appl. No. 15/271,749), dated Mar. 7, 2019, 6 pages.
S Nagasai et al: "Plant Disease Identification using Segmentation Techniques", International Journal of Advanced Research in Computer and Communication Engineering, vol. 4, No. 9, Sep. 1, 2015 (Sep. 1, 2015), XP55500057, DOI: 10.17148/IJARCCE.2015.4988.
S. Nagasai, et al., 'Plant Disease Identification using Segmentation Techniques', In: International Journal of Advanced Research in Computer and Communication Engineering, Oct. 5, 2015, vol. 4, Issue 9, ISSN (Online) 2278-1021 (https://www.ijarcce.com/upload/2015/september-15/?C=N;O=A) See abstract; and pp. 411-412.
Sagar Patil et al., "A Survey on Methods of Plant Disease Detection," International Journal of Science and Research (IJSR), 2015, vol. 4, Issue 2, ISSN (Online): 2319-7064.
Sagar Patil et al: "A Survey on Methods of Plant Disease Detection", International Journal of Science and Research, vo 1. 4, No. 2, Feb. 1, 2015 (Feb. 1, 2015), pp. 1392-1396, XP55500036.
Sanjeev S. Sannakki et al., "Comparison of Difference Leaf Edge Detection Algorithms Using Fuzzy Mathematical Morphology," International Journal of Innovations in Engineering and Technology (IJIET), 2012, vol. 1, Issue 2, ISSN: 2319-1058.
Shah Jitesh Pet al: "A survey on detection and classification of rice plant diseases", 2016 IEEE International Conference on Current Trends in Advanced Computing (ICCTAC), IEEE, Mar. 10, 2016 (Mar. 10, 2016), pp. 1-8, XP032960803, DOI: 10.1109/ICCTAC.2016.7567333 [retrieved on Sep. 13, 2016] *abstract* *Sec.VII* * Sec. V * * figure.
U.S. Appl. No. 15/271,630, Corrected Notice of Allowability, dated Jan. 23, 2020, 9 pages.
U.S. Appl. No. 15/271,658, Final Office Action dated Jul. 29, 2019, 31 pages.
U.S. Appl. No. 15/271,630, Final Office Action dated Apr. 17, 2019, 11 pages.
U.S. Appl. No. 15/271,630, Non-Final Office Action dated Sep. 26, 2018, 18 pages.
U.S. Appl. No. 15/271,630, Notice of Allowance, dated Jan. 15, 2020, 18 pages.
U.S. Appl. No. 15/271,630, Notice of Allowance, dated Nov. 20, 2019, 22 pages.
U.S. Appl. No. 15/271,658, Non Final Office Action dated Jan. 8, 2020, 36 pages.
U.S. Appl. No. 15/271,658, Non-Final Office Action dated Sep. 19, 2018, 8 pages.
U.S. Appl. No. 15/271,658, Notice of Allowance dated May 5, 2020, 47 pages.
U.S. Appl. No. 15/271,727, Final Office Action dated Apr. 25, 2019, 36 pages.
U.S. Appl. No. 15/271,727, Non Final Office Action dated Feb. 4, 2020, 62 pages.
U.S. Appl. No. 15/271,727, Non-Final Office Action dated Oct. 2, 2018, 22 pages.
U.S. Appl. No. 15/271,749, Final Office Action dated Mar. 16, 2020, 52 pages.
U.S. Appl. No. 15/271,749, Non Final Office Action dated Oct. 16, 2019, 58 pages.
U.S. Appl. No. 15/271,749, Office Action dated Sep. 11, 2020, 63 pages.
U.S. Appl. No. 15/891,110, Final Office Action dated Dec. 17, 2018, 13 pages.
U.S. Appl. No. 15/891,110, Non Final Office Action dated Oct. 24, 2019, 32 pages.
U.S. Appl. No. 16/859,891, Office Action dated Sep. 14, 2020, 40 pages.
U.S. Appl. No. 15/891,110, Final Office Action dated May 1, 2020, 31 pages.
Vaglica, "Shrub Pruning Dos and Donts", Aug. 3, 2016, https://www.thisoldhouse.com/ideas/shrub-pruning-dos-and-donts (Year: 2016).
European Patent Application No. 17853932.6, Office Action dated Dec. 16, 2021, 7 pages.
European Patent Application No. 17853934.2, Office Action dated Dec. 9, 2021, 8 pages.
U.S. Appl. No. 15/271,749, Notice of Allowance dated Mar. 23, 2022, 214 pages.
U.S. Appl. No. 15/271,749, Notice of Allowance dated Feb. 24, 2022, 139 pages.
U.S. Appl. No. 16/859,891, Notice of Allowance dated Dec. 29, 2021, 16 pages.

* cited by examiner

RELIABLE TRANSFER OF NUMEROUS GEOGRAPHICALLY DISTRIBUTED LARGE FILES TO A CENTRALIZED STORE

RELATED APPLICATIONS

This application is a continuation of U.S. patent application Ser. No. 15/271,658, filed on Sep. 21, 2016, and titled "Reliable Transfer of Numerous Geographically Distributed Large Files to a Centralized Store," which is a continuation-in-part of U.S. patent application Ser. No. 15/271,569, filed on Sep. 21, 2016, titled, "Hi-Fidelity Computer Object Recognition Driven Horticultural Feedback Loop," which are hereby incorporated herein in their entirety.

BACKGROUND

Presently, effective automated horticultural feedback loops based on computerized object recognition are not enabled. Specifically, where a horticultural feedback loop seeks to assign a computerized image capture device on a per plant or substantially on a per plant basis, and to have one or more images captured per day, a relatively large number of large image files would be transferred over a network for centralized analysis. Because image files are relatively large, the number of image files transferred frequently and periodically for centralized evaluation may be prohibitively large. This problem is increased by degrees of magnitude for industrial scale horticultural operations involving several geographically disparate locations.

In general, transfers of large image files, over a geographically disparate area may bog down limited network bandwidth. Since every plant substantially has its own image capture device, preventing deadlock from file uploads, and detecting corrupt files adds the challenge of scalability. In general, the means to schedule and manage transfers of numerous large files, such as image files, sufficient to support effective object recognition based horticultural feedback analysis presently does not exist.

BRIEF DESCRIPTION OF THE DRAWINGS

The Detailed Description is set forth with reference to the accompanying figures.

DETAILED DESCRIPTION

Context of Reliable Transfer of Large Files

Object recognition based horticultural feedback analysis ("ORB-HFA") is the application of a feedback loop to a horticultural operation, where substantially each plant is monitored by its own image capture device which uploads images relatively frequently and periodically. Generally the period is at least once a day, but often the image capture period is several times a day. The captured digital images constitute the measurement portion of the feedback loop. The images are centralized, subjected to advanced computer image analysis, including object recognition, and identification of issues based on object recognition. The identified issues are themselves subjected to analysis and remedial courses of action are returned to the horticultural operation. After applying the remedial courses of action, the ORB-HFA cycle repeats.

Figure 1:
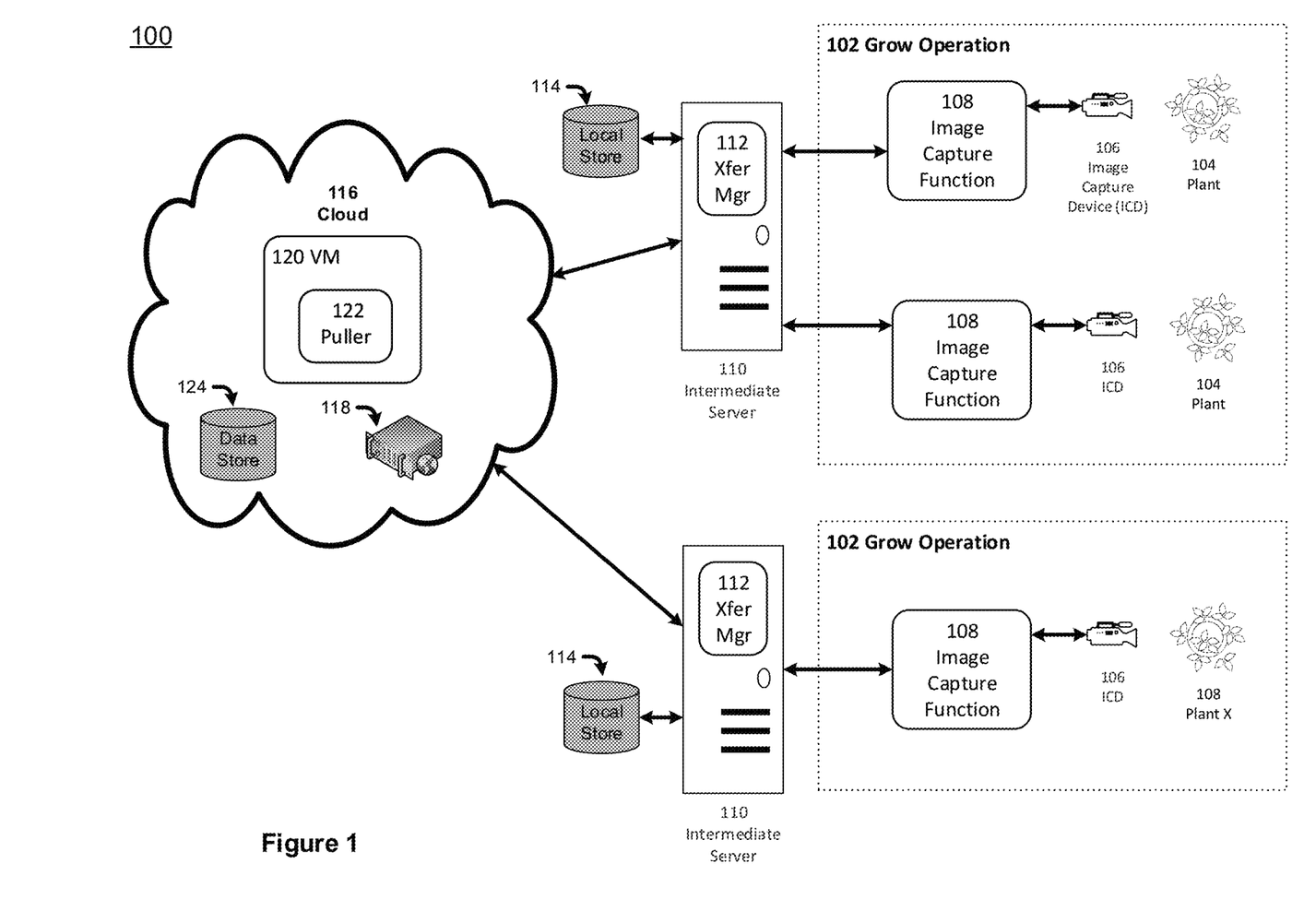
FIG. 1 is a top level diagram of an exemplary reliable transfer of large files.

ORB-HFA is made possible via the ability to reliable manage the frequent and periodic transfer of images from geographically distributed image captured image devices to a centralized storage. In this way, cloud based processing resources sufficient for advanced image processing may be applied to the images in centralized storage. FIG. 1 is a context diagram 100 of file transfer management in ORB-HFA.

A horticultural operation may comprise several grow operations 102. A grow operation 102 may be in a greenhouse or an open field or a particular location in a greenhouse or an open field. A grow operation 102 comprises a plurality of plants 104. A grow operation 102 is a logical grouping of plants 104, thus the plants 104 in a grow operation's 102 need not be in the same geographical location. For example, a grow operation 102 may have plants in one greenhouse as well as another greenhouse. One example of such a grow operation 102 is a set of red roses 104 destined to be shipped in the same lot to the same customer, but being grown in different greenhouses.

Substantially each plant 104 will be monitored by an image capture device (ICD) 106. An image capture device may be a digital video camera or a digital still camera configured to capture images periodically, i.e. capture images over a repeating time interval.

The image capture device 106 may be networked and may transfer captured images over the network. Alternatively, the image capture device 106 may be connected to, or part of a computing device with an image capture function 108. The image capture function 108 manages the flow of image transfers away from the image capture device 108. The image capture function 108 is described in more detail with respect to FIG. 2.

The image capture function 108 may transfer files to an intermediate server 110 with a transfer manager software component 112 and associated software components (not shown). The transfer manager software component 112 may store received images from an image capture function 108 or from an image capture device 106 to a local data store 114 or to the cloud 116. The determination whether to store to a local data store 114 or to transfer to the cloud 116, may involve many factors, including the availability of bandwidth, and terms from a service level agreement governing services on the cloud 116. The intermediate server is described in further detail with respect to FIG. 2. The transfer manager software component 112 and its operation is described in further detail with respect to FIG. 2, FIG. 3 and FIG. 4.

Image file transfer may be based on either a push or pull architecture. In one embodiment, software on the cloud 116 may affirmatively pull images from an intermediate server 110, or alternatively directly from an image capture function 108 or even an image capture device 106. The cloud 116 may comprise several disaggregated servers 118 which provide one or more virtual machines 120. A virtual machine 120 may host a puller software component 122 and associated software components (not shown). The puller software component 122 and associated software components (not shown), may manage the transfer of image files for storage in a cloud store 124. The cloud and its components are described in further detail with respect to FIG. 2. The puller software component 122 and its operation is described in further detail with respect to FIG. 2 and FIG. 5.

Exemplary Hardware, Software and Communications Environment

Figure 2:
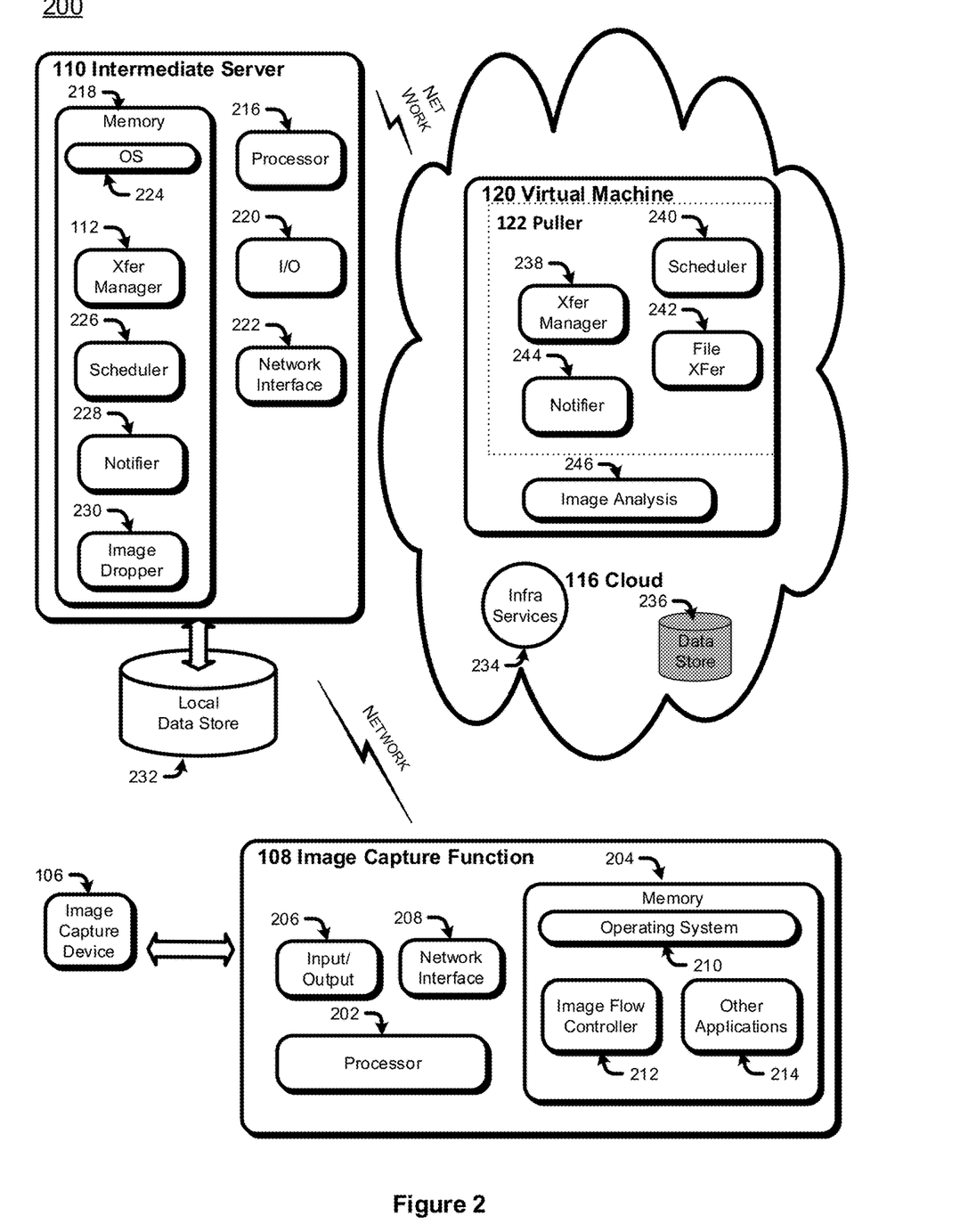
FIG. 2 is a flow chart of an exemplary hardware, software and communications environment for reliable transfer of large files.

Prior to disclosing reliable transfer of geographically distributed large files and related techniques in the context of Object Recognition Based Horticultural Feedback Analysis (ORB-HFA) and related techniques, an exemplary hardware, software and communications environment is disclosed. FIG. 2 illustrates several possible embodiments of a hardware, software and communications environment 200 for file transfer and related techniques for ORB-HFA.

Image Capture

Images are captured via an image capture device 106. As described above, the image capture device 106 may be a digital video camera or a digital still camera configured to capture images periodically and/or on demand. Generally an image capture device 106 may take visible light spectra pictures, but may also extend to non-visible spectra such as infrared and ultraviolet. The image capture device 106 may have an on board application programming interface (API) enabling programmatic control. Alternatively the image capture device 106 may be networked thereby enabling remote control.

Control functions for image capture may be in a separate image capture function 108. The image capture function 108 may incorporate the image capture device 106 and may be part of a larger integrated device, such as a lumière feedback device (not shown). Indeed, both the image capture device 106 and the image capture function 108 may be part of the lumière feedback device.

Hardware for Image Capture Control Function

The image capture control function 108 is generally hosted on a computing device. Exemplary computing devices include without limitation personal computers, laptops, embedded devices, tablet computers, smart phones, and virtual machines. In many cases, computing devices are to be networked.

The computing device for the image capture control function 108 may have a processor 202 and a memory 204. The processor may be a central processing unit, a repurposed graphical processing unit, and/or a dedicated controller such as a microcontroller. The computing device for the image capture control function 108 may further include an input/output (I/O) interface 206, and/or a network interface 208. The I/O interface 206 may be any controller card, such as an universal asynchronous receiver/transmitter (UART) used in conjunction with a standard I/O interface protocol such as RS-232 and/or Universal Serial Bus (USB). The network interface 208, may potentially work in concert with the I/O interface 206 and may be a network interface card supporting Ethernet and/or Wi-Fi and/or any number of other physical and/or datalink protocols.

Memory 204 is any computer-readable media which may store several software components including an operating system 210 and software components such as an image flow controller 212 and/or other applications 214. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

Image Flow

The image flow controller 212 is a software component responsible for managing the capture of images, receiving images from the image capture device 106 (if not integrated with the image capture function 108) the local management of received images, and potentially the transmission of received images off the image capture function 108 over a network. The image flow controller 212 may store a configuration setting of how many images an image capture device 106 is to capture, the resolution the image is to be captured, the format the image is to be stored, and any other processing to be performed on the image. The image flow controller 212 may store a captured and/or received image into a buffer in the memory 204 and name the filename of the received image. Other applications 214 may be utilities to perform image processing, such as compression and/or encryption.

The image flow controller 212 may also manage the transmission of received images. Specifically, it may transmit an image to a known network location via the network interface 208. The known network locations may include an intermediate server 110 or an internet and/or cloud location 116.

Upon transmission, the image flow controller 212 may enlist in notifications to determine that the transmission was successful. The image flow controller 212 may also transmit notifications to other device subscribing to its notifications indicating status of a transmission.

Intermediate Server

The image capture function 108 may communicate to an intermediate server 110. The intermediate server 110 is any computing device that may participate in a network. The network may be, without limitation, a local area network ("LAN"), a virtual private network ("VPN"), a cellular network, or the Internet. The intermediate server 110 is similar to the host computer for the image capture function. Specifically, it will include a processor 216, a memory 218, an input/output interface 220 and/or a network interface 222. In the memory 218 will be an operating system 224 and various software components including a transfer manager software component 112, a scheduler software component 226, a notifier software component 228, and an image dropper component 230. The role of the intermediate server 110 is to forward images received from the image capture functions 108 based on network conditions, conditions in the received images, service level agreements, and other conditions. In some embodiments, the intermediate server 110 may provide intermediate storage for images in a local data store 232. The local data store 232 may be integrated as part of the intermediate server 110, or alternatively may be connected to the intermediate server 110, or may be networked to the intermediate server 110 as a network aware storage or file server.

Intermediate Server Software Components

The intermediate server 110 hosts a transfer manager software component 112 which makes determinations as to whether to transfer an image received from an image capture function 108 or from an image capture device 106, or to store the image in a local data store 232. The role of the transfer manager software component 112 includes determining whether an image has sufficient content to transfer and scheduling transfers based on an upload condition. Example upload conditions include optimizing network throughput and minimizing cost.

In effect, the transfer manager software component 112 determines when to schedule file transfers. The actual scheduling is performed by a scheduler software component 226. The scheduler software component 226 may execute a script to transfer a file or set of files at a time prescribed by the transfer manager software component 112. The scheduler software component 226 may use operating system utilities such as "cron" or "at" which provide low level scheduling services.

There may be other parties who wish to know when a file transfer has been scheduled, whether a file has been stored locally, when an error condition has occurred, or other events of interest. A notifier software component 228 tracks subscribing parties transmits notifications to publish the aforementioned events of interest. Subscribing parties may include a receiving server and an administrator. By virtue of transmitting a notification of when a file has been transferred, a receiving server may know when to prepare for image analysis. Otherwise, the receiving server would have to poll all the intermediate servers 110 to check for file transfers. Similarly, by virtue of transmitting a notification of error conditions, an administrator may receive alerts of those errors, rather than having to poll a large number of intermediate servers.

One class of error is a violation of a service level agreement. Generally an ORB-HFA operation will include a cloud installation 116, and the cloud installation 116 is governed by a service level agreement with a cloud service provider. In the service level agreement is a set of information describing service guarantees by the cloud provider. For example, the cloud provider will describe the percentage of uptime, availability of servers, quality of service and price. Where any of these metrics in the set of information is not honored, the cloud service provider is in violation of the service level agreement. Where the service level agreement is not honored, an administrator should contact the cloud service provider since the violation may be an early indicator of an infrastructure failure. Generally, the transfer manager software component 112 will check or service level agreement violations when a file is stored locally, and the notifier software component 228 will send a notification to alert an administrator.

Other classes of errors may relate to the local data store 232. If an image is not to be immediately uploaded, the transfer manager software component 112 stores the image in the local data store 232 in preparation for future transfer. However, in some cases the local data store 232 may be full. In this event, an image dropper software component 230 determines whether to drop the pending image, or to drop other images stored in the local data store 232. The image dropper software component 230 makes the determination to drop images in an effort to preserve time sequence of images and the periodicity of images. When the image dropper software component 230 drops images, it sends an error notification via the notification software component 228.

Cloud

Generally, advanced image processing may be hosted on the cloud 116 to take advantage of the elastic processing power available in the cloud 116. Accordingly, images may be hosted on the cloud 116 in a centralized storage to be proximate to image processing. Images may be brought to centralized storage either through a push architecture, where an intermediate server 110 pushes files affirmatively to the central storage, or through a pull architecture, where a transfer manager on the cloud pulls images to the central storage. In such an architecture, a puller software component 122 and associated software components may be hosted in the cloud 116. Note that the cloud 116 may host an arbitrary service. In fact, an intermediate server 110 may alternatively be hosted on the cloud 116 as well.

The cloud 116 may provide services via an integrated cloud infrastructure 234. Services generally include providing virtual machines 120 and storage 236. Cloud infrastructure 234 not only provides access to cloud infrastructure services 120 and 236, but also to billing services and other monetization services. Cloud infrastructure 234 may provide additional service abstractions such as Platform as a Service ("PAAS"), Infrastructure as a Service ("IAAS"), and Software as a Service ("SAAS").

A server on the cloud 116, may either be a physical dedicated server, or may be a virtual machine 120. In the latter case, the cloud 116 may represent a plurality of disaggregated servers which provide virtual machine 120 functionality and virtual storage/database 236 functionality. The disaggregated servers are physical computer servers, which may have a processor, a memory, an I/O interface and/or a network interface. The features and variations of the processor, the memory, the I/O interface and the network interface are substantially similar to those described for the host of the image capture function 108, and the intermediate server 110. Differences may be where the disaggregated servers are optimized for throughput and/or for disaggregation.

Cloud Based File Transfer Software Components (Puller)

In a pull based architecture, a virtual machine 120 may host a puller software component 122 responsible for downloading image files from an intermediate server 110, or alternatively directly from an image capture function 108 or image capture device 106.

The puller software component 122 includes a transfer manager software component 238, similar to the transfer manager software component 112 on the intermediate server 110, except configured to pull images rather than to push images. The transfer manager software component 238 may make determinations as to whether to transfer files or not based on network bandwidth availability and service level agreement information.

Upon determining to transfer a file, the transfer manager software component 238 schedules a transfer via a scheduler software component 240. The scheduler software component 240 is analogous to the scheduler software component 226 on the intermediate server 110. A file transfer software component 240 performs the actual file transfers, for example via file transfer protocol (FTP), or file copy operations. Upon file transfer, or upon the detection of error, a notifier software component 244, analogous to the notifier software component 228 on the intermediate server 110 may publish notifications to subscribing users.

Upon receipt of an image file, an image analysis software component 246 may perform advanced image analysis such as performed by an image processing server as described in co-pending patent application Ser. No. 15/271,569, entitled "Hi Fidelity Computer Object Recognition Based Horticultural Feedback Loop" herein incorporated by reference.

In this way, an image may be captured by an image capture device 106, forwarded to an intermediate server 110 by image capture function 108, and stored on a cloud storage 236, via a push architecture or alternatively a pull architecture.

Reliable File Transfer Via Push Architecture

Figure 3:
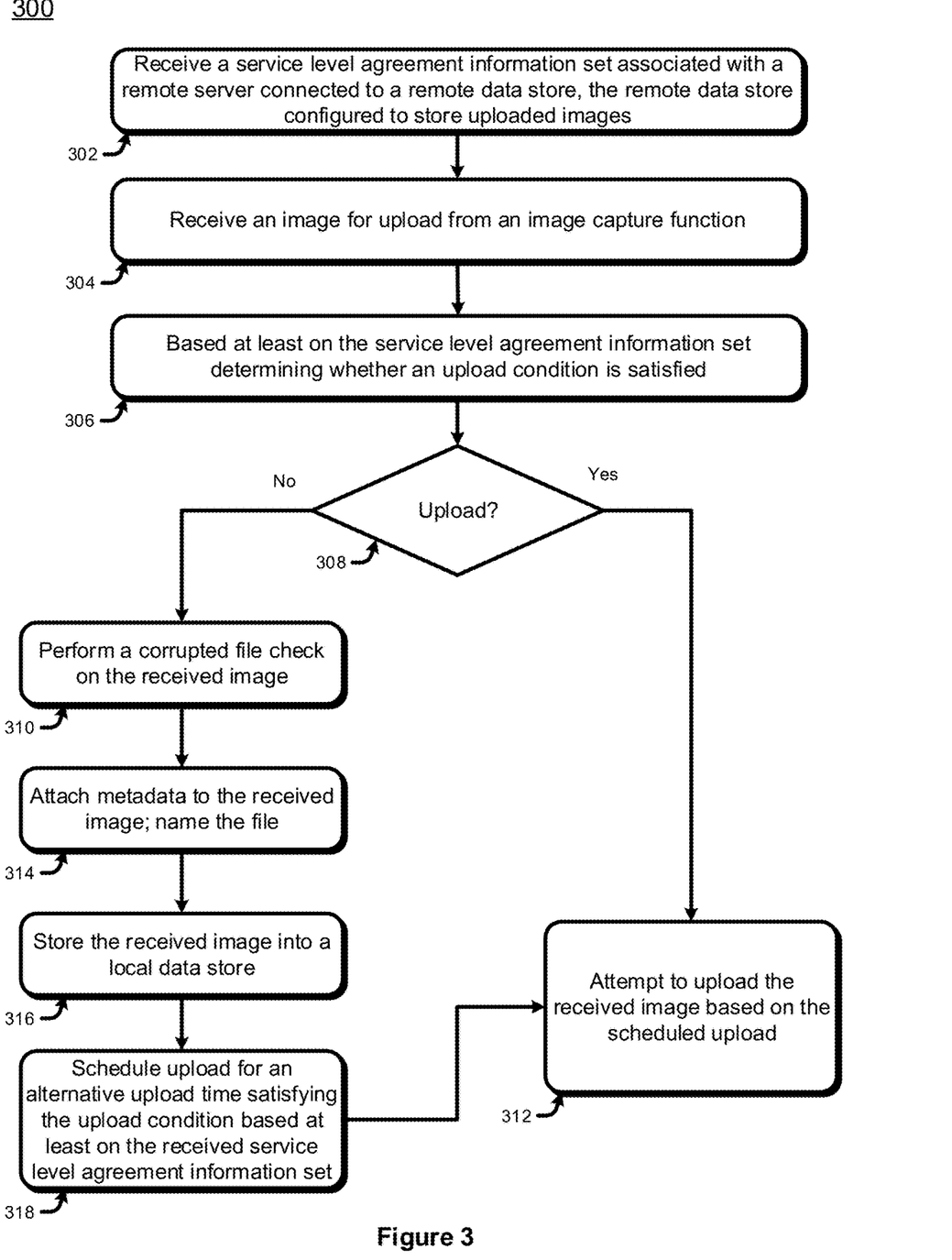
FIG. 3 is a flow chart of an exemplary embodiment of reliable transfer of large files from the perspective of an intermediate server sending files to a cloud based server.

An intermediate server 110 is configured to receive images from a plurality of image control functions 108, and based on present conditions, determine whether to transfer a received image or to store the received image locally. FIG. 3 is a flow chart 300 for such a determination.

In block 302, the transfer manager 112 receives baseline information to make its future determinations. This baseline information may include a subset of information from service level agreement. For example, the service level agreement may indicate that file transfers are cheapest between 1 am and 6 am, and that accordingly file transfers would ideally be scheduled during this time window. Service level agreement information may also be used subsequently to determine whether a service level agreement violation has occurred.

Other baseline information may include historical data of file transfers as well as network traffic. For example, baseline information may indicate that network usage is at a minimum between 2 am and 3 am, that large file transfers would ideally be performed in that time window.

In block 304, the intermediate server 110 receives an image from an image control function 108 or from another source. Per block 306, the transfer manager 112 makes use of service level agreement information and/or historical information to determine whether an upload condition has been met. An upload condition is a rule set by an administrator as to how to prioritize file transfer. Example upload conditions may include, (1) upload immediately, (2) minimize cost, and (3) transfer only during low network usage. Upload conditions need not be global. For example, individual images may have been set with different priority levels. Images over a particular priority level may be subject to different upload conditions. For example, a high priority image may be uploaded immediately, but a lower priority image may be stored locally until network usage is expected to be low.

Other upload conditions may be based on imminence of file transfer. For example, if the local store 232 is full or nearly full, and the transfer manager software component 112 has been receiving notifications that the cloud 116 will not be receiving images (or pulling images via a puller software component 122), then the transfer manager software component 112 may set images to be uploaded as soon as possible, to make space available on the local store 232.

In some embodiments, the upload condition may be always set to false. This may occur when the intermediate server 110 is configured to have a puller software component 122 pull images from the intermediate server 110 rather than for the transfer manager software component 112 to push images to the cloud 116.

If the upload condition is not met, per block 308, the received image is stored to the local data store 232, starting in block 310. Otherwise, per block 312, the transfer manager software component 112 attempts to push the image to the cloud 116.

In block 310, first a file check to determine whether a file is corrupted, or does not have sufficient information is performed. If the file cannot be opened, the file may be discarded without saving and a notification sent via the notifier software component 228. Alternatively, a color histogram may be made of the received image. If the histogram indicates that there is too much noise in the image, or the image is obstructed such that the received image is not useful, again, the file may be discarded without saving and a notification sent via the notifier software component 228. This content check may also be performed later as described with respect to FIG. 4.

Otherwise, in block 314 additional metadata may be attached to the received file, and the file named. Metadata may include grow operation identifiers, plant identifiers, and priority. Note that the image may have native metadata such as a date time stamp. In some cases, the metadata may be attached via a file naming convention. For example, a file name may be NorthAmericanAzalea_Batch012_GreenhouseB_19092016.jpg, indicating the plant in the image, the grow operation (batch), location, and date captured.

Upon the attaching of metadata, and the file naming, in block 316 the received image may then be stored in local data store 232.

In block 318, the transfer manager software component 112 may then schedule a file transfer to the cloud 116, via scheduler 226 according to the upload condition. At the appointed time, per block 312, the transfer manager software component 112 may attempt to upload the image file to the cloud 116.

File Transfer Error Checks in Push Architecture

Throughout the transfer management process described with respect to FIG. 3, the transfer manager software component 112 is performing error checks, and publishing notifications as errors are encountered. Example notifications may include service level agreement violations, insufficient image information, and insufficient local storage. An exemplary notification and error handling process is shown in flow chart 400 in FIG. 4.

Figure 4:
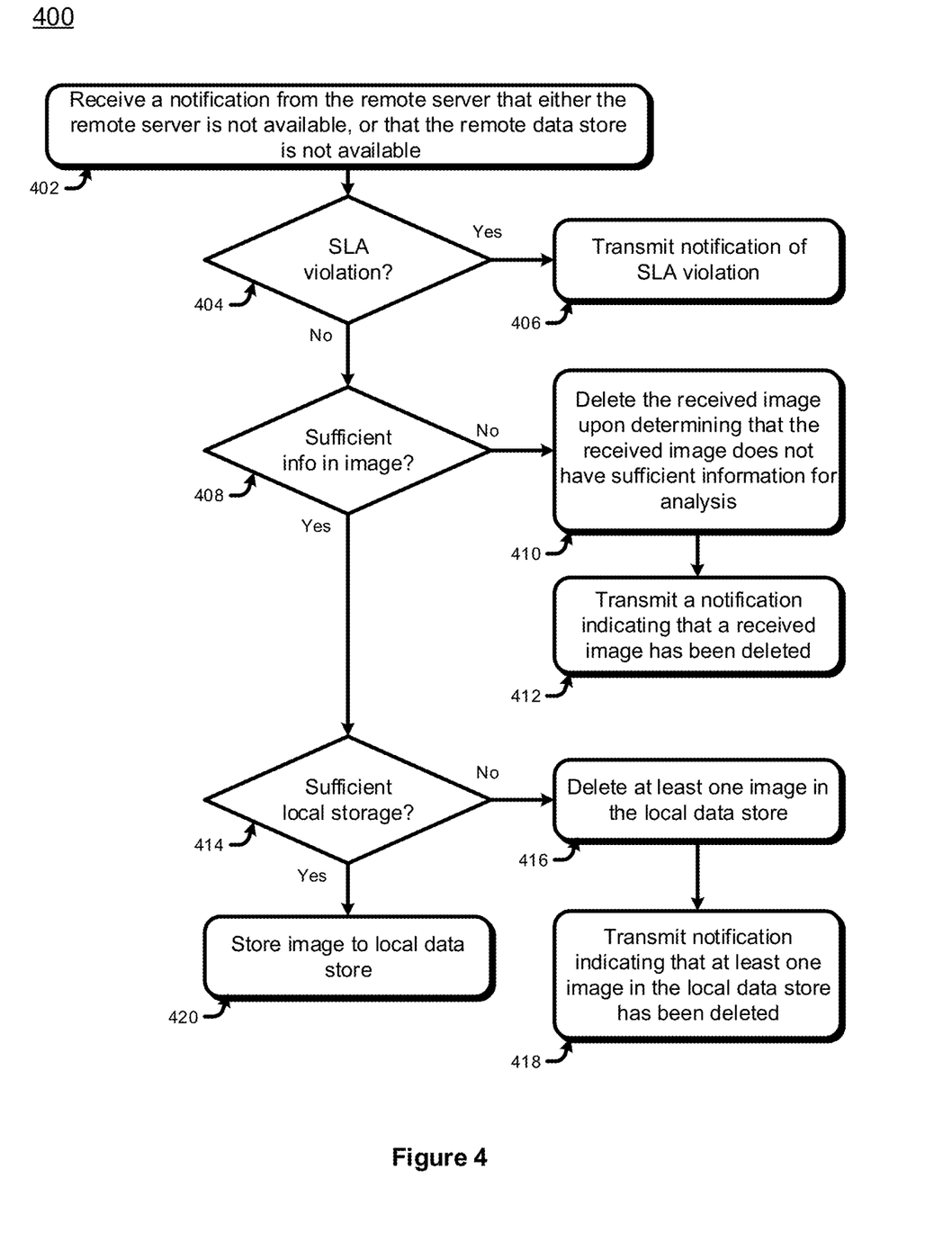
FIG. 4 is a flow chart of exemplary embodiment of error condition and notifications during the reliable transfer of large files from the perspective of an intermediate server sending files to a cloud based server.

The transfer manager software component 112 may subscribe to notifications from the network or other components. For example, in block 402, the transfer manager software component 112 may receive a notification that the cloud server or storage is not available, or that the network is down. In this circumstance, an image scheduled to be uploaded cannot be transferred. Accordingly, the transfer manager software component 112 will have the notifier software component 228 publish a notification that an image transfer failed due to cloud server being unavailable.

The transfer manager software component 112 may store a long term history of server unavailable incidents and may calculate out frequency and length of time of those incidents. Comparing frequency and length of server unavailable incidents against received service level agreement information, in block 404, the transfer manager software component 112 may determine whether the cloud service provider is violating the service level agreement. If so, in block 406, the notifier software component 228 may publish a notification of a service level agreement violation. In many cases, an administrator may subscribe to such notifications. In this way, an administrator may discover network outages despite having a large number of geographically disparate intermediate servers 110.

Turning to block 408, when the local data store 232 is full or nearly full, the transfer manager software component 112 may make a determination whether to drop the received image, or to delete selected images in the local data store 23. To perform the former, in block 408, the transfer manager software component 112 may measure the color histogram in the received image, or make other measurements to determine whether the received image has sufficient information to be useful. For example, where a received image is predominantly dark colors, the image may be dropped as either being obstructed, or being insufficiently lighted.

In block 410, if the transfer manager software component 112 determines that the received image has insufficient information, the transfer manager software component 112 may delete the received image and per block 412, the notifier software component 228 may send a notification of the deletion. In this way, images in the local data store 232 need not be dropped in favor of a low quality received image.

However, if the received image is of sufficient quality, but per block 414 there is a low amount of local store 232, the transfer manager software component 112 may invoke the image dropper software component 230 to delete some images on local store 232. The image dropper software component 230 not only is to make more storage space available, but is to do so to best preserve the frequency and periodicity of the images on the local store 232.

To do so, the image dropper software component 230 will make use of the metadata attached to each image to individually identify plants. First plants with a low priority will have their images sorted by time. The images will be set to have a minimum periodicity of one day, with the image for the day being taken as close to the late afternoon as possible, as to capture work performed on the plant. Some of the remainder of the images may be deleted by the image dropper software component 230.

If more space is to be cleared from the local data store 232, the next level of priority of plants may be deleted in the same fashion. This process may continue until the transfer manager software component 112 determines that sufficient space is available on local data store 232.

In block 418, the notifier software component 228 publishes a notification that the image dropper software component 230 has dropped at least one image. Since the image dropper software component 230 may drop multiple images, to reduce notifications, the notifier software component 228 may be configured to send a single notification, indicating the number of images dropped and the identity of the images, rather than a notification per image dropped.

Otherwise, if sufficient space is available, per block 420, the received image is stored in local data store 232.

In this way, the transfer manager software component 112 is enabled to send notifications in the case of network outages, service level agreement violations, and dropped images. In general, the transfer manager software component 112 may store historical data, and detect issues to bring to the attention of an administrator or other party.

Reliable File Transfer Via Pull Architecture

Figure 5:
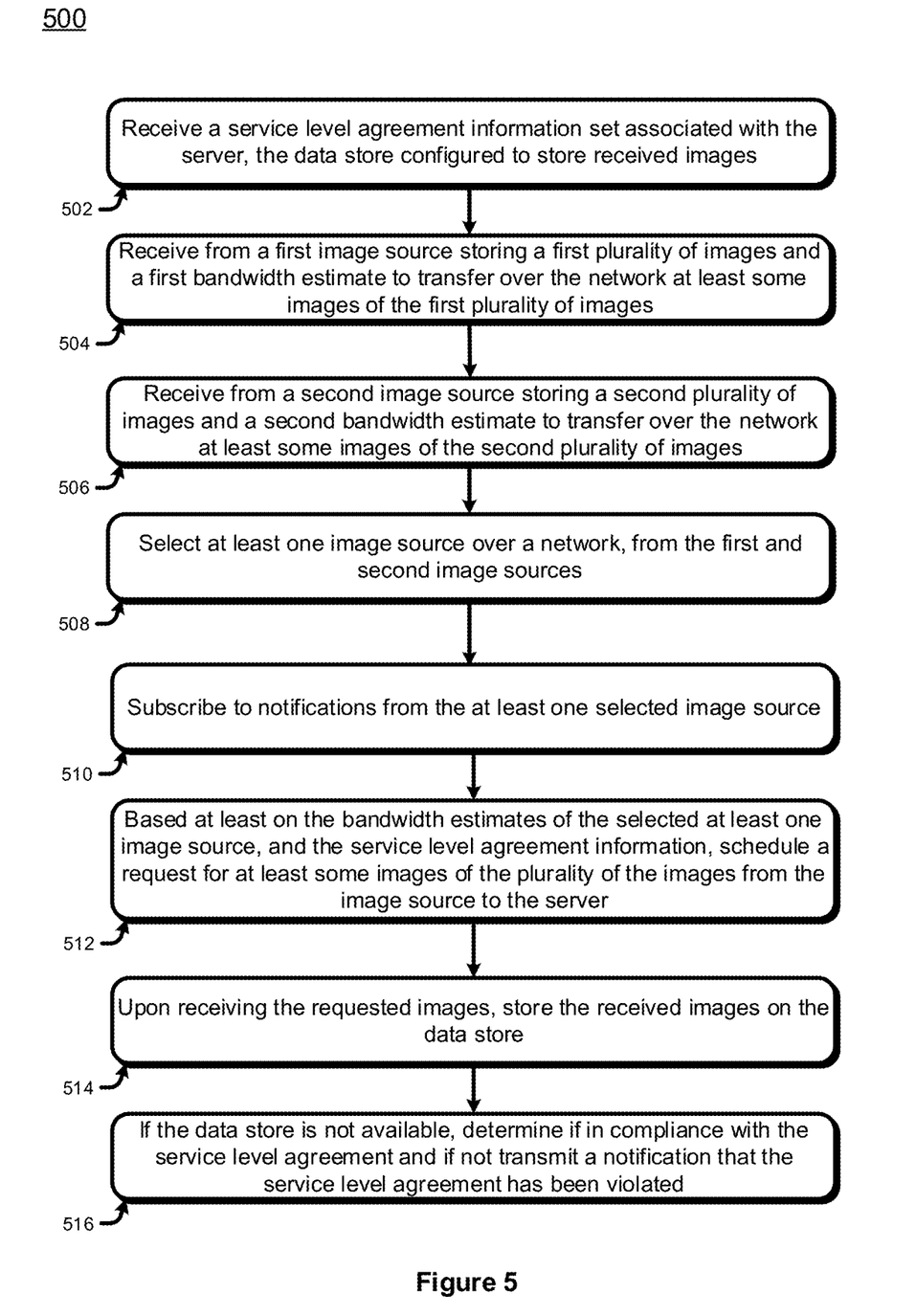
FIG. 5 is a flow chart of an exemplary embodiment of reliable transfer of large files from a perspective of a cloud based server receiving files from an intermediate server.

As described above, reliable file transfer may be performed via either a push architecture or a pull architecture. In the pull architecture embodiment, a puller software component 122 may pull images from the intermediate server 110, the image capture function 108, and/or the image capture devices 106, collectively known as "image sources". In general, an image source is a storage of images that is network accessible by the puller software component 122. FIG. 5 is an exemplary flow chart 500 for the operations of the puller software component 122.

The puller software component 122 includes a transfer manager software component 238. It is analogous to the transfer manager software component 112 on the intermediate server 110, but is configured for pull operations rather than push operations. However, the transfer manager software component (puller) 238 manages file transfer operations in the puller software component 122. In block 502, the transfer manager software component 238 receives baseline information to make decisions on whether to transfer files or not. This includes service level agreement information as well as historical information, similar to as described above with respect to the transfer manager software component 112 on the intermediate server 110.

The location of the transfer manager software component (puller) 238 in the cloud enables it to receive images from multiple image sources. Accordingly, in blocks 504 and 506, the transfer manager software component (puller) 238 may receive respectively the identity of a first image source storing a plurality of images and the identity off a second image source storage a second plurality of images. The first and second image sources may also send over an estimate of the network bandwidth to be used to perform their respective file transfers. This estimate is generally performed by summing the file sizes of the images to be transferred. Alternatively, where the image file size has been standardized, the transfer manager software component (puller) 238 may calculate the estimate on the puller software component 122 side by multiplying the reported file counts with the standard image file size.

In block 508, the transfer manager software component (puller) 238 may select one or both of the first and second image sources. Where an image source is selected, or alternatively is rejected by the transfer manager software component (puller) 238 the notifier software component 244 may be configured to publish a notification to the image sources. In this way, an image source can determine whether a file transfer is imminent or not.

Similarly, where a transfer manager software component (puller) 238 has selected an image source, in block 510, it may subscribe to notifications from that image source. In this way, the transfer manager software component (puller) 238 may coordinate file transfer with a selected image source based on conditions communicated by the image source via notifications.

In block 512, the transfer manager software component (puller) 238 may then determine when to schedule download of files from the selected image sources, based on download conditions set by an administrator. Download conditions are the conditions to be satisfied to schedule a download. Download conditions may be based on service level agreements, present network traffic, expected network traffic based on historical conditions and the like.

In one embodiment, the transfer manager software component (puller) 238 may sum the amount of network bandwidth to transfer image files from the selected image sources. The selected image sources may also be associated with a priority, or alternatively the selected image sources may transmit notifications of conditions increasing their priority (for example their local store 232 is nearly full). Based on priority, the transfer manager software component (puller) 238 may schedule downloads based on download conditions as set by an administrator.

In one embodiment, the download condition may be to minimize cost. Accordingly, downloads may be scheduled by the transfer manager software component (puller) 238 via a scheduler 240 to be limited during low cost file transfer time windows per the service level agreement. Alternatively, downloads may be scheduled by the transfer manager software component (puller) via a scheduler 240 to be limited during low network traffic conditions based on historical measurements. Downloads need not be limited. For example, a download condition may be to download files of image sources with nearly full local storage 232 as soon as possible.

Upon the appointed time arriving, the file transfer software component 244 may effect file transfers as scheduled. Per block 514, upon the images arriving, the file transfer software component 244 may store the images in cloud data store 236. This data store 236 acts as a centralized data store for images, where image processing may be performed by image analysis software component 246. An example of an image analysis software component 246 is an image processing server as described in co-pending patent application Ser. No. 15/271,569, entitled "Hi Fidelity Computer Object Recognition Based Horticultural Feedback Loop" herein incorporated by reference.

As with the transfer manager software component 112 on the intermediate server 110, the transfer manager software component (puller) 238 performs ongoing error checking and publishes notifications via the notifier software component 244 accordingly. In the event that files failed to transfer, the notifier software component 244 may publish a notification to the image source that another attempt to transfer, or other remedial action is imminent. Where cloud storage 236 is unavailable, the notifier software component 244 may publish a notification to an administrator. Similar to the transfer manager software component 112 on the intermediate server 110, the transfer manager software component (puller) 238 may also store a log of ongoing issues. Where the issues constitute a violation of the service level agreement with the cloud provider, the notifier software component 244 sends a notification to an administrator.

In this way, a puller software component 122 may negotiate with one or several image sources, perform prioritized and bandwidth aware downloads accordingly to download conditions, and store images on a central storage for advanced image processing. Specifically, a large number of images from several remote image sources are stored on a cloud storage 236 for processing by an image analysis software component 246 to enable object recognition based horticultural feedback analysis.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   under control of one or more processors:
   receiving, from an image capture function, a first image;
   analyzing the first image to determine whether the first image has sufficient information;
   in response to the first image having sufficient information, identifying an upload condition to upload the first image to a remote data store that stores a second image;
   determining that a capacity of the remote data store is insufficient to store related first images associated with the first image and associated with a first temporal frequency;
   determining that a first priority of the first image is greater than a second priority of the second image;
   based on determining that the first priority is greater than the second priority, reducing a second temporal frequency associated with future second images associated with the second image; and
   uploading the first image to the remote data store based at least in part on the upload condition.

2. The computer-implemented method of claim 1, wherein determining whether the first image has sufficient information comprises determining wither the first image is corrupt.

3. The computer-implemented method of claim 1, further comprising:
   generating a color histogram of the first image; and
   determining whether the first image has a predominance of dark colors or an insufficient lighting, and
   wherein, determining whether the first image has sufficient information is based at least in part on the predominance of dark colors or the insufficient lighting.

4. The computer-implemented method of claim 1, further comprising:
   determining that the first image does not satisfy the upload condition; and
   storing the first image in a local data store.

5. The computer-implemented method of claim 1, further comprising:
   receiving, a service level agreement associated with the remote data store, and
   wherein, the upload condition is based at least in part on the service level agreement.

6. The computer-implemented method of claim 1, further comprising:
   determining network bandwidth availability to upload the first image, and
   wherein, the upload condition is based at least in part on the network bandwidth availability.

7. The computer-implemented method of claim 1, wherein the upload condition corresponds to scheduling the upload of the first image based at least in part on the first priority.

8. The computer-implemented method of claim 1, further comprising:
   determining that there is insufficient capacity at the remote data store to store the first image;
   determining that if the second image and related second images associated with the second image stored on the remote data store were deleted, then the remote data store would have sufficient capacity to store the first image;
   and
   in response to the first priority being greater than the second priority and determining that if the second image and the related second images associated with the second image were deleted, then the remote data store would have sufficient capacity to store the first image, deleting the stored images on the remote data store.

9. The computer-implemented method of claim 1, further comprising:
   receiving, from the image capture function, a bandwidth estimate to transfer the first image to the remote data store, and wherein, uploading the first image is further based at least in part on the bandwidth estimate.

10. The computer-implemented method of claim 1, further comprising:
in response to a failure to satisfy the upload condition, transmitting a notification to an administrator indicating the failure to satisfy the upload condition.

11. The computer-implemented method of claim 1, further comprising:
in response to determining that the first image has insufficient information, transmitting a notification to the image capture function that indicates a failure to upload due to insufficient information.

12. A system, comprising:
one or more processors;
memory coupled to the one or more processors;
a local data store configured to store a plurality of images;
a transfer manager software component, resident in the memory, configured to:
receive upload conditions associated with an upload of a first image to the local data store;
determine whether the first image has sufficient information;
a scheduler software component, resident in the memory, configured to schedule an upload of the first image in the local data store that stores a second image;
an image dropper software component, resident in the memory, configured to:
determine whether a capacity of the local data store is sufficient to store the first image;
determine that the capacity of the local data store is insufficient to store related first images associated with the first image and associated with a first temporal frequency;
determine that a first priority of the first image is greater than a second priority of the second image; and
based on determining that the first priority is greater than the second priority, reduce a second temporal frequency associated with future second images associated with the second image; and
a notifier software component, resident in the memory, configured to transmit a notification indicating whether the first image is stored within the local data store.

13. The system of claim 12, wherein to determine the first image has sufficient information is based at least in part on an analysis of file corruption and a color histogram of the first image, and wherein the transfer manager is further configured to:
in response to determining that the first image has insufficient information, delete the first image.

14. The system of claim 12, wherein the transfer manager software component is further configured to receive a service level agreement, the service level agreement including the upload conditions.

15. The system of claim 12, wherein the scheduler software component is further configured to schedule the upload of the first image based at least in part on the first priority.

16. The system of claim 12, wherein the image dropper software component is further configured to:
determine that the capacity of the local data store is insufficient to store the first image;
determine that if the second image and related second images associated with the second image stored in the local data store were deleted, then the capacity of the local data store would be sufficient to store the first image;
and
delete the stored images within the local data store to provide sufficient capacity to store the captured image, in response to the first priority being greater than the second priority and determining that if the second image and related second images associated with the second image were deleted, then the capacity of the local data store would be sufficient to store the first image.

17. A server, comprising:
one or more processors;
memory coupled to the one or more processors;
a data store configured to store a plurality of images; and
the memory including one or more modules that are executable by the one or more processors to:
select an image capture function over a network, the data store to store a first image;
receive, from the image capture function, a bandwidth estimate to transmit the first image over the network;
schedule a transfer of the first image from the image capture function to the data store, based at least in part on the bandwidth estimate;
determine that a capacity of the data store is insufficient to store related first images associated with the first image and associated with a first temporal frequency;
determine that a first priority of the first image is greater than a second priority of a second image stored in the data store;
based on determining that the first priority is greater than the second priority, reduce a second temporal frequency associated with future second images associated with the second image; and
store, within the data store, the first image.

18. The server of claim 17, wherein the one or more modules are further executable by the one or more processors to:
determine that there is insufficient capacity within the data store to store the first image;
and
delete the second image within the data store to provide sufficient capacity to store the first image, in response to the first priority being greater than the second priority.

* * * * *